United States Patent [19]
Kimura et al.

[11] Patent Number: 5,752,176
[45] Date of Patent: May 12, 1998

[54] FM RADIO RECEIVER AND SIGNAL PROCESSING DEVICE USED THEREIN

[75] Inventors: Kazuhiro Kimura, Fukaya; Shigeaki Hayashibe, Gunma-ken; Yutaka Hirakoso, Gyoda; Takahiko Masumoto; Shizuka Ishimura, both of Gunma-ken; Toshiyuki Ozawa, Ota; Munehiro Suka, Tokyo-to, all of Japan

[73] Assignee: Sanyo Electric Co., Ltd., Osaka, Japan

[21] Appl. No.: 624,739

[22] Filed: Mar. 26, 1996

[30] Foreign Application Priority Data

Mar. 30, 1995 [JP] Japan .................. 7-074071

[51] Int. Cl.[6] .................................. H04B 1/18
[52] U.S. Cl. ............... 455/184.1; 375/376; 455/186.1
[58] Field of Search ........................ 455/184.1, 181.1, 455/185.1, 186.1, 45; 375/336, 376

[56] References Cited

U.S. PATENT DOCUMENTS

| | | | |
|---|---|---|---|
| 4,881,273 | 11/1989 | Koyama et al. | 455/186.1 X |
| 5,222,254 | 6/1993 | Verron et al. | 455/186.1 |
| 5,239,681 | 8/1993 | Parnall et al. | 455/186.1 X |
| 5,404,588 | 4/1995 | Henze | 455/186.1 |
| 5,444,744 | 8/1995 | Yamamoto et al. | 375/376 |

*Primary Examiner*—Thomas Mullen
*Attorney, Agent, or Firm*—Loeb & Loeb LLP

[57] ABSTRACT

An SI judging circuit in a service detecting section detects a service identification code included in a block included in received superimposed FM data. When the block represents an unnecessary service, the SI judging circuit generates a predetermined service detecting signal, which is supplied to a station selecting microcomputer. A user operates a station selecting key to request the change of the broadcasting station. When the change is requested, and also the service detecting signal indicating that the service included in the received block is not needed is supplied to the station selecting microcomputer by the SI judging circuit, a control section of the station selecting microcomputer outputs station data corresponding to the requested station to a PLL synthesizer, and then the frequency signal (tuning frequency) is changed at a front end. This enables data received during a period for receiving blocks for unnecessary services to be NG, and can prevent data of blocks including necessary services from being NG.

13 Claims, 9 Drawing Sheets

| b1 b2 b3 b4 (HEX) | CONTENT |
|---|---|
| 0 0 0 0 (0) | UNDEFINED |
| 1 0 0 0 (1) | GENERAL INFORMATION (SUCCESSIVE RECEIVING) |
| 0 1 0 0 (2) | GENERAL INFORMATION LEVEL 1 (RECORDED RECEIVING) |
| 1 1 0 0 (3) | GENERAL INFORMATION LEVEL 2 (RECORDED RECEIVING) |
| 0 0 1 0 (4) | TRAFFIC INFORMATION LEVEL 1 |
| 1 0 1 0 (5) | TRAFFIC INFORMATION LEVEL 2 |
| 0 1 1 0 (6) | TRAFFIC INFORMATION LEVEL 3 |
| ⋮ | UNDEFINED |
| 1 0 1 1 (D) | ADDED INFORMATION |
| 0 1 1 1 (E) | SUPPLEMENTARY INFORMATION |
| 1 1 1 1 (F) | OPERATING SIGNAL |

FM RADIO RECEIVER AND SIGNAL PROCESSING DEVICE USED THEREIN

BACKGROUND OF THE INVENTION

1. Field of the invention

The present invention relates to an FM radio receiver and a signal processing device used therein, and particularly to an FM radio receiver having a function of receiving a multiplex FM broadcast on which data, such as character information, are superimposed.

2. Description of the prior art

Multiplex FM broadcasts on which character information is superimposed have recently begun to be transmitted. In this multiplex FM broadcasting, encoded character information is superimposed on stereo FM signals. The superimposed information includes news and traffic information at present. The broadcasting of figure information useful for an automobile navigation system is being investigated.

Figure 1:
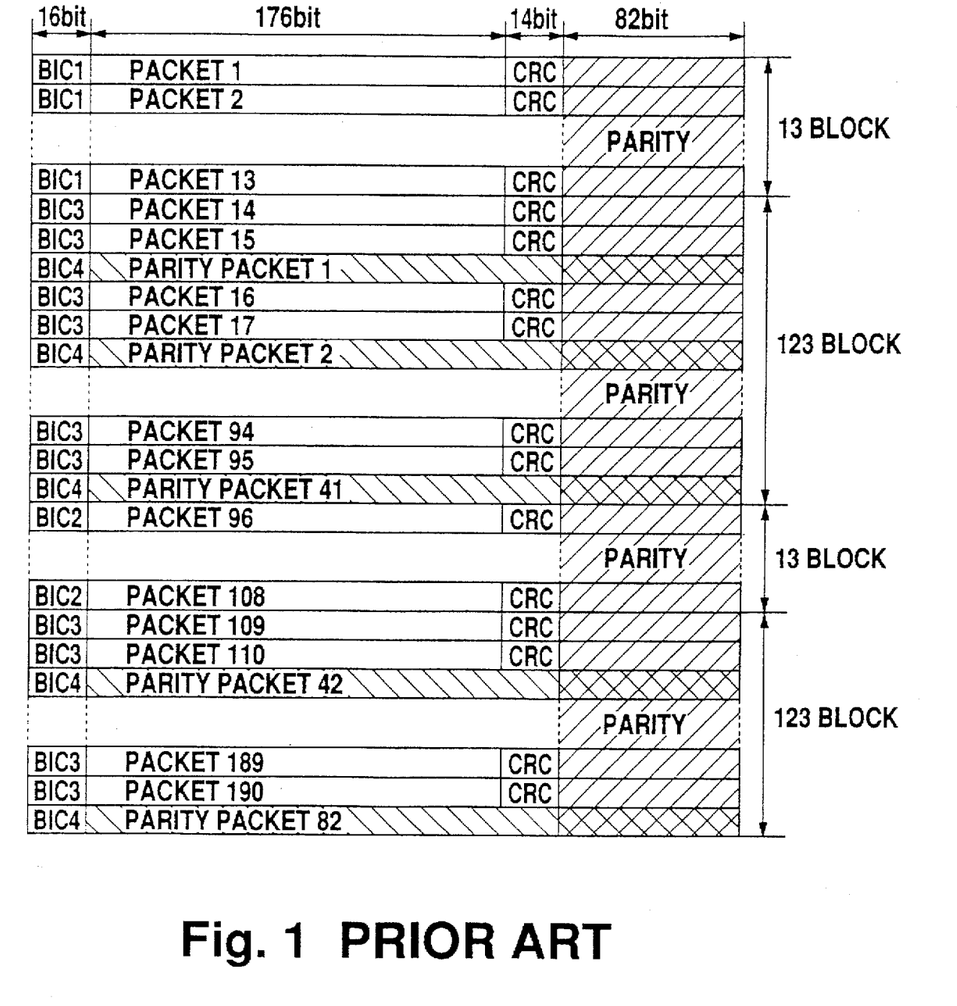
FIG. 1 represents the structure of a frame of a superimposed FM signal in multiplex FM broadcasting.

In the data radio channel (DARC) standard, multiplex FM data superimposed on a stereo FM signal have a frame structure composed of 288×272 bits, as shown in FIG. 1.

Figure 2:
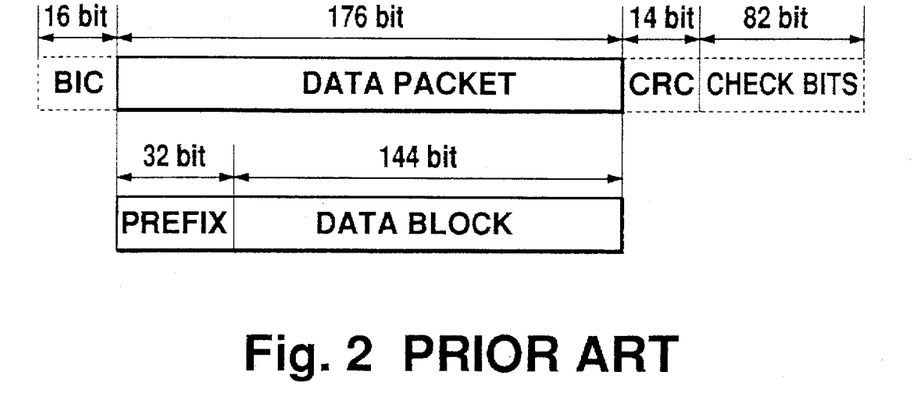
FIG. 2 represents the structure of the data packet of a block in the frame shown in FIG. 1.

One line of the frame (one block) consists of a block identification code (BIC) composed of 16 bits, an error correcting code for correcting data errors which is composed of a cyclic redundancy code (CRC; 14 bits) and parity (82 bits), and data packet composed of 176 bits. The data packet in the block consists of a prefix composed of 32 bits and a data block composed of 144 bits, as shown in FIG. 2.

The respective superimposed FM data provided in multiplex FM broadcasting, such as character information, figure information and traffic information for an automobile navigation system, are transmitted by the block of the frame. A service identification code (SI) is added to the prefix of the block so that it is discerned what type of data among character information, figure information, traffic information for an automobile navigation system and so on, is superimposed on a received block.

In normal FM broadcasting, carrier waves are modulated by the main channel signal (L+R), pilot signal and sub channel signal (L−R). In the multiplex FM broadcasting, a frequency band of the modulation signal for the superimposed FM data is set to be higher than that of the sub signal in the usual FM broadcasting (centered at 76 kHz) in order not to interfere with the channel and pilot signals. Digital data obtained by level controlled minimum shift keying (LMSK) modulation in the higher frequency band is superimposed at a rate of 16 kbits/sec so that the block is transmitted for 18 msec, and accordingly the frame is transmitted for 5 sec.

When receiving such multiplex FM broadcasts, a decoder for selecting and decoding the superimposed FM data, and a display for indicating character or figure information according to the provided service, need to be added to a normal FM radio receiver. Many multiplex FM radio receivers suitable for particular objectives of superimposed data have been proposed. One indicates only character information, while another is combined with a navigation system.

Figure 3:
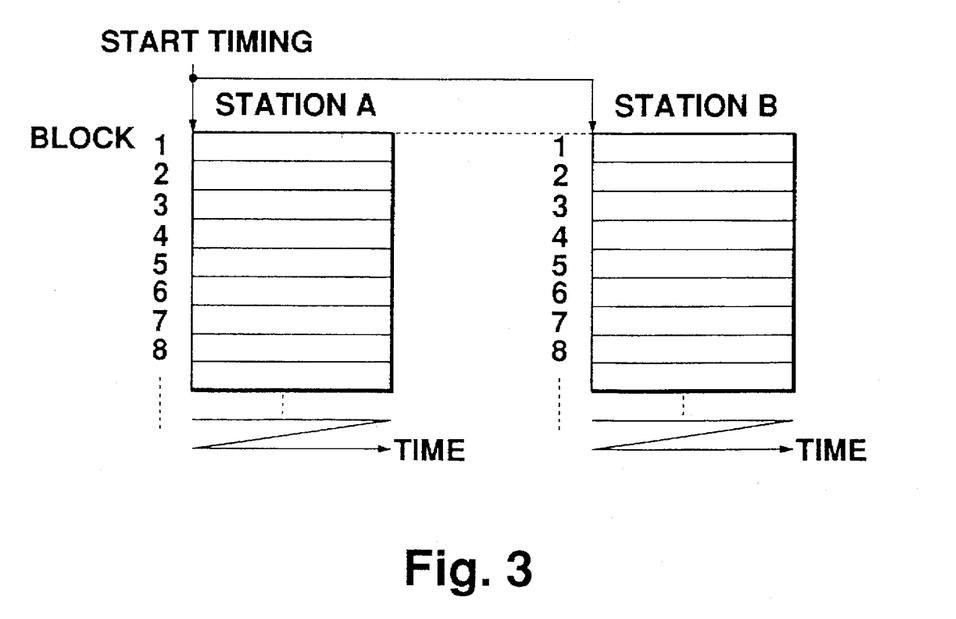
FIG. 3 represents superimposed FM data which are transmitted simultaneously from a plurality of broadcasting stations.

In multiplex FM broadcasting, a plurality of broadcasting stations in one group probably transmit an identical program at the same time, as the stations A and B shown in FIG. 3. When the program is received by a receiver placed in a moving body, such as a vehicle, it is possible that the intensity of electric field of the carrier waves from the broadcasting station A becomes smaller, and that from the station B becomes larger. If the transmissions of the superimposed FM data are synchronized between the stations A and B, that is, the frame and block transmitted from the station A always start at the same timing as those from the station B, as shown in FIG. 3, the receiver placed in the moving body can continuously receive the superimposed FM data by changing the received station from A to B.

When the received station is changed from A to B, a user first operates a selecting key, as in a normal receiver. The received frequency of carrier waves is changed at the front end of a multiplex FM radio receiver in response to the user's key operation, enabling the receiver to receive the transmission from the station B.

When changing the received broadcasting station, it is necessary to change the received frequency of carrier waves from the station A to the frequency of carrier waves from the station B to realize the receiving of a broadcast from the station B. It takes a slightly longer time to enable receiving of a broadcast from the station B. The broadcast cannot be caught during this time, and consequently the data superimposed on the broadcast for this time fail to be correctly received, causing an error (NG).

The change in received frequency is performed immediately in response to a request for changing the received station through the operation of a selecting key at an arbitrary time, as described above. Therefore, even when a multiplex FM radio receiver indicating only character information is receiving a block including character information (SI 2), the change in received frequency occurs, causing a problem that data from the character information can become NG. If the NG occupies a large part of the character information data, it is difficult to correctly decode the data in the frame. This can make the already received character information data useless. Therefore, it is necessary to reduce the useless data arising during the change of the received broadcasting station.

SUMMARY OF THE INVENTION

In order to solve the above problem, the present invention provides an FM radio receiver enabling the change of a received broadcasting station at an appropriate timing, and a signal processing device used in the FM radio receiver.

An FM radio receiver for receiving a multiplex FM broadcast on which data are superimposed, provided by the present invention, comprises a station selecting section for selecting a frequency signal of a requested broadcasting station, a service judging section for detecting a service identification code of a block in superimposed FM data included in a multiplex FM broadcast being received, and judging the kind of service included in the block, a timing signal generating section for generating a station change timing signal based on the kind of service detected, and a station selecting control section for permitting the frequency signal in the station selecting section to change according to the station change timing signal.

In the FM radio receiver provided by the present invention, the service identification code is detected to judge the kind of provided service. The timing for the change in frequency signal (tuned frequency) of a broadcasting station is controlled according to the determination. This can prohibit the received frequency from changing at an arbitrary timing even when the change of the station is requested.

The service judging section judges whether the service included in the received block is needed according to the detected service identification code, and generates an unnecessary service detecting signal when the received block is not needed. The timing signal generating section generates the station change timing signal in response to the generation of the unnecessary service detecting signal.

The FM radio receiver provided by the present invention further comprises a station change directing section for generating a station change request signal for changing a broadcasting station. The station selecting section generates a frequency signal based on a station data signal corresponding to the requested broadcasting station. The station selecting control section supplies the station data signal created based on the station change request signal to the station selecting section in response to the generation of the station change timing signal.

The station selecting control section has a plurality of flip-flop circuits. The flip-flop circuit outputs the station data signal to the station selecting section, when the station data signal is supplied to its data terminal in response to the station change request signal, and the station change timing signal is supplied to its clock terminal from the timing signal generating section.

The timing signal generating section generates the station change timing signal in response to the unnecessary service detecting signal and station change request signal.

Specifically, the timing signal generating section generates the station change timing signal for a certain period when the unnecessary service detecting signal and station change request signal are supplied.

A signal processing device provided by the present invention, which is used in an FM radio receiver for demodulating data superimposed on a received FM signal of a selected broadcasting station, comprises a service judging section for detecting whether the service included in a block in the received FM data superimposed on a multiplex FM broadcast is needed according to the service identification code of the block, and generating an unnecessary service detecting signal if the received block is not needed, and a timing signal generating section for generating a station change timing signal based on the unnecessary service detecting signal.

Figure 5:
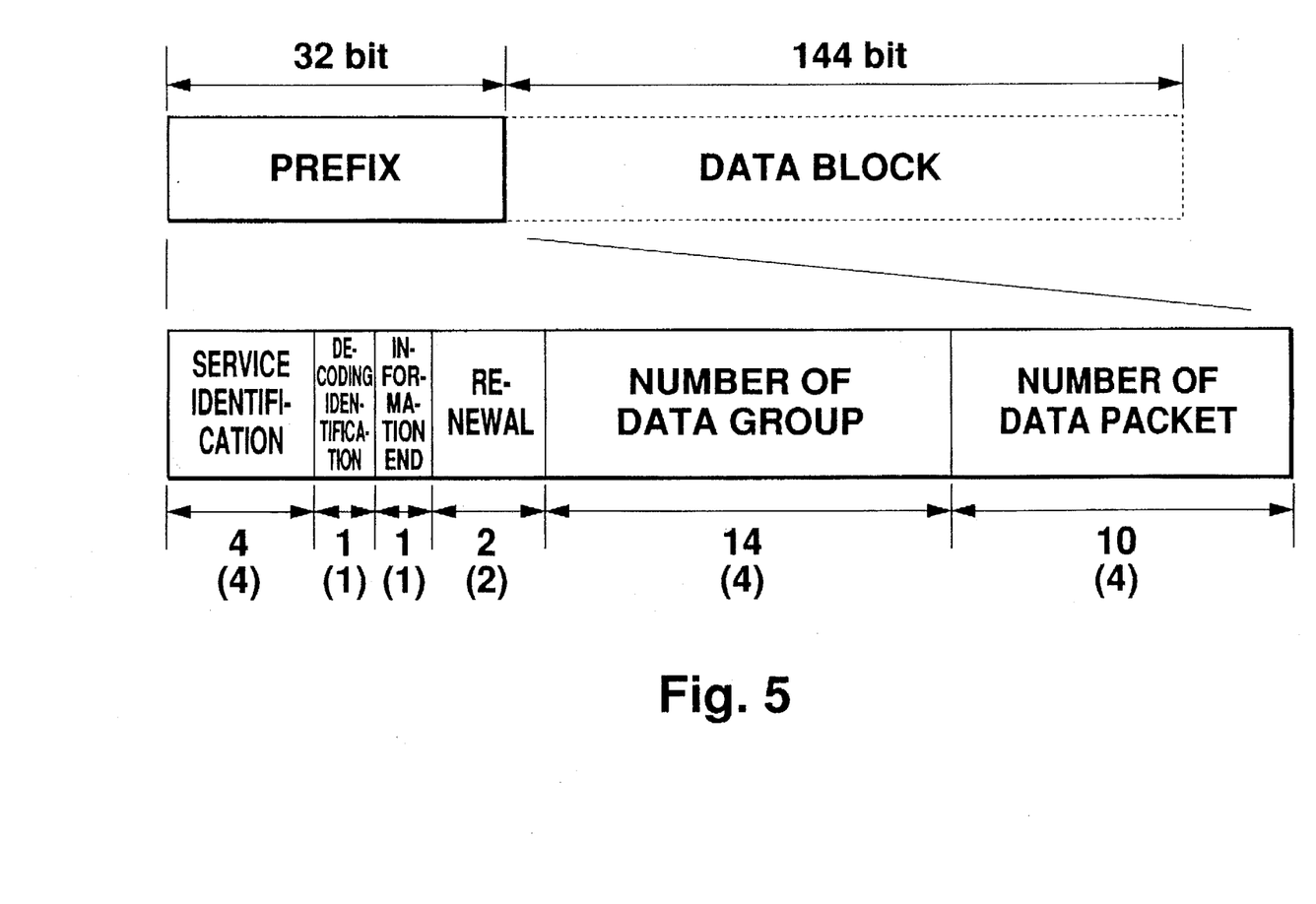
FIG. 5 represents the structure of a prefix in superimposed FM data.
Figure 6:
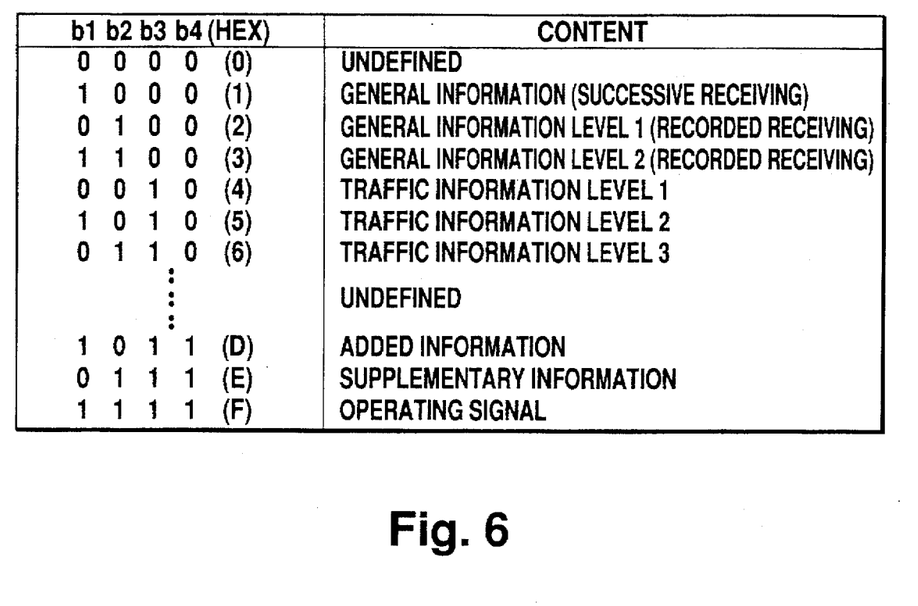
FIG. 6 represents the content of a service identification code in superimposed FM data.

As shown in FIG. 5, the first four bits of a 32 bit prefix, a data parity of superimposed FM data, are the service identification code (SI). The SI indicates the kind of provided service, such as character information, figure information and traffic information, as shown in FIG. 6. The SI can define services of 16 kinds because it is composed of 4 bits. At present, SI 1 to 6 (HEX) are defined. SI's 1, 2 and 3 are assigned to general information including normal news, and SI's 4, 5 and 6 are assigned to traffic information. Levels 1 and 2 are defined for general information, and Levels 1, 2 and 3 for traffic information. Level 1 provides a service of character information, and for an FM radio receiver which can display data consisting of a main document composed of two lines (15 characters/line), and a header line. Level 2 provides a service of character and figure information for an FM radio receiver which can display data consisting of a main document composed of eight lines (15 characters/line), and a header line. Level 3 provides a service of traffic information, such as traffic jam information, used in a navigation system for vehicles.

These plural kinds of information (for example, SI 1 to 6) are assigned to a plurality of blocks in superimposed FM data transmitted from a broadcasting station, for example, a certain block has data with SI 2, the next has data with SI 4. Therefore, blocks including data identified by SI's 3, 4, 5 and 6 are useless for a multiplex FM radio receiver which can only display general information identified by Level 1 of SI 2, and consequently need not be received.

Figure 4A:
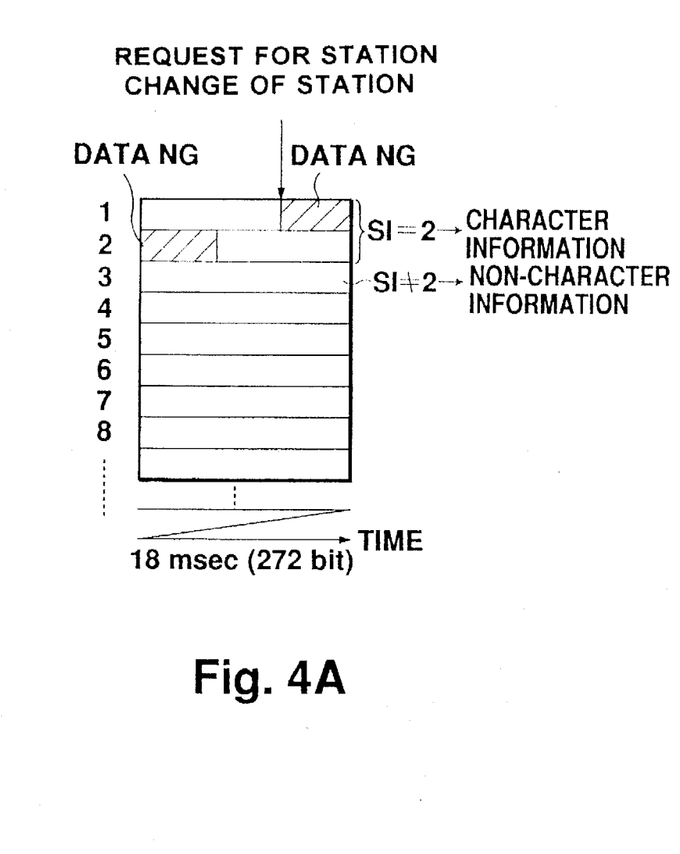
Figure 4B:
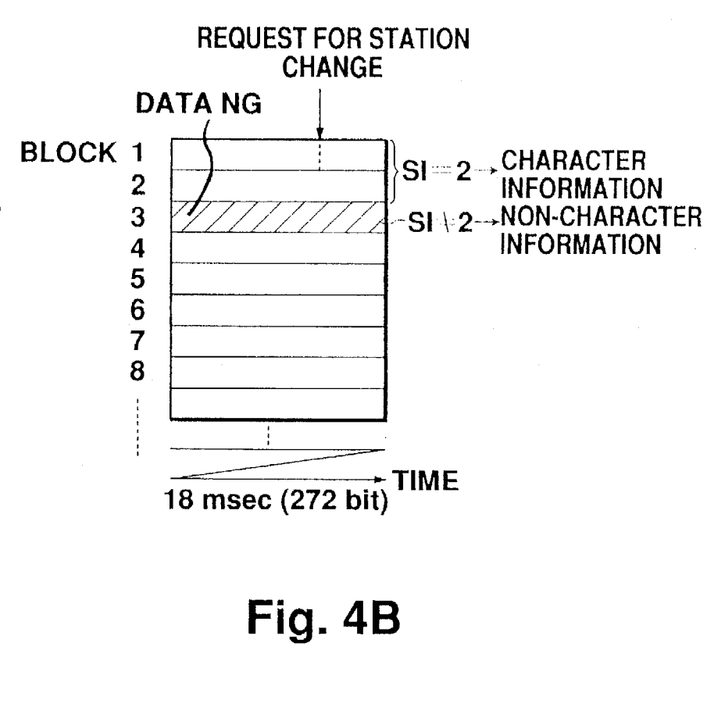

An FM radio receiver and signal processing device used therein provided by the present invention utilizes data blocks which need not be received. As shown in FIG. 4B, the change in received frequency, which is carried out according to a request for changing the station, is initiated in response to the generation of the unnecessary service detecting signal. Consequently, the change in frequency signal (tuned frequency) is carried out in a period of receiving blocks including unnecessary services.

The FM radio receiver and signal processing device used therein provided by the present invention realizes that data received in a period for receiving requested data does not become NG, and data received in a period for receiving unnecessary data are selectively made NG. The received frequency can be changed to that of a requested station in a period during which blocks including unnecessary data succeed. This reduces an NG part of the necessary data in practice. Therefore, a useless part of the previously received superimposed data can be reduced.

BRIEF DESCRIPTION OF THE DRAWINGS

FIG. 4 A represents an NG period of data received by a conventional FM radio receiver.

FIG. 4 B represents an NG period of data received by an FM radio receiver provided by the present invention.

DESCRIPTION OF THE PREFERRED EMBODIMENT

A preferred embodiment of the present invention will be described hereinafter with reference to the drawings.
[Structure of FM radio receiver]

Figure 7:
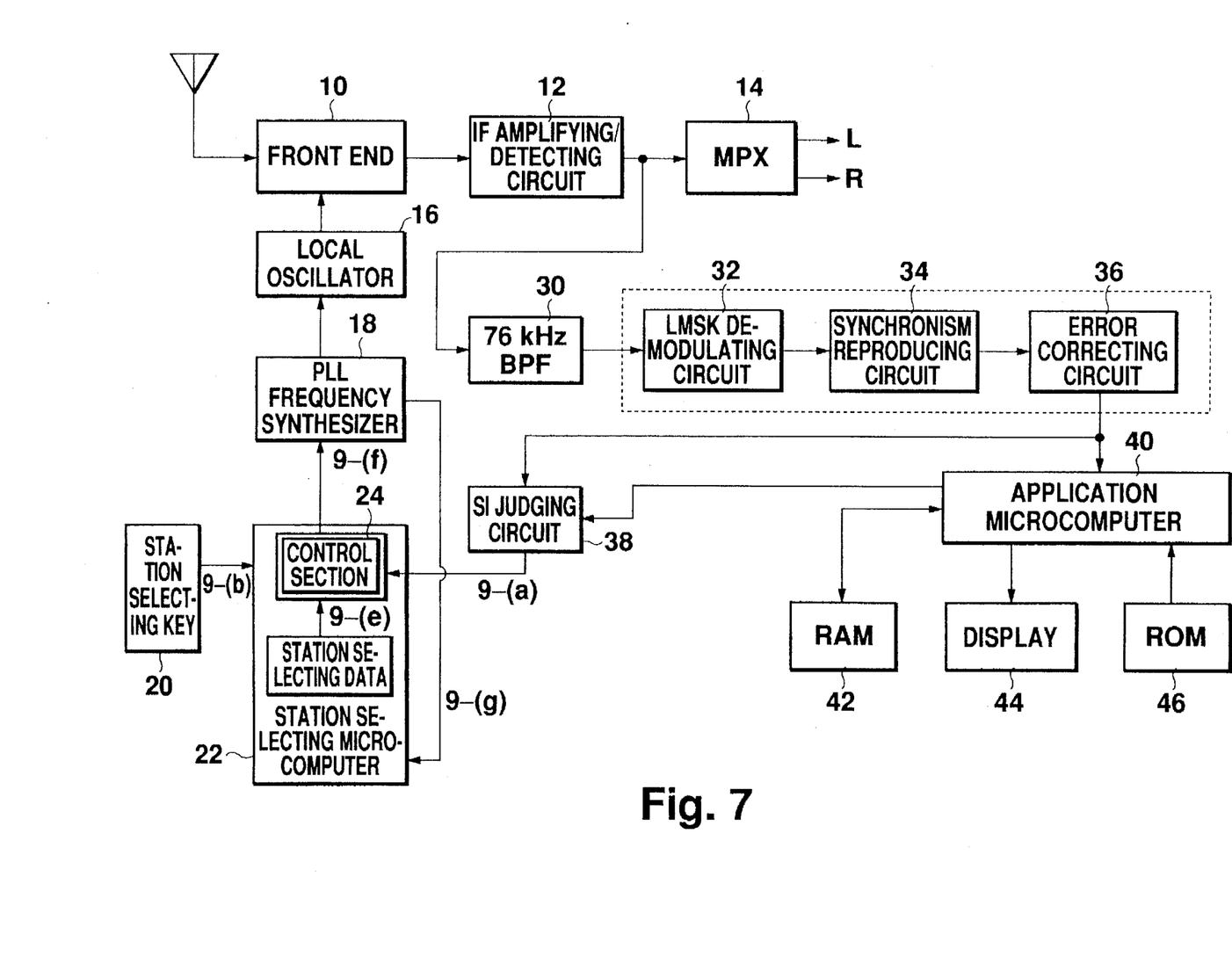
FIG. 7 represents a simplified structure of the main section of an FM radio receiver according to the preferred embodiment of the present invention.

The main structure of an FM radio receiver according to the preferred embodiment of the present invention is shown in FIG. 7.

Carrier waves (radio frequency signals), received with an antenna are supplied to a front end 10. The front end 10 mixes the carrier waves received by the antenna with a signal which is supplied from a local oscillator 16, and has a predetermined frequency corresponding to a requested broadcasting station. A frequency signal for the requested station, which is converted to an intermediate frequency (IF=10.7 MHz), is extracted.

The extracted signal for the requested station is amplified and detected in an IF amplifying/detecting circuit 12. A detected signal whose voltage level varies corresponding to the frequency for the requested station is outputted from the IF amplifying/detecting circuit 12.

The detected signal from the IF amplifying/detecting circuit 12 is supplied to an MPX 14. A normal stereo signal is stereophonically demodulated in the MPX 14. L and R signals are supplied to speakers to reproduce sounds.

A requested broadcasting station is selected by the operation of a station selecting key 20 by a user. The station selecting microcomputer 22 supplies station data corresponding to the requested station to a PLL frequency synthesizer 18 in response to an output signal from the station selecting key. The PLL frequency synthesizer 18 operates in response to the supplied station data, and then changes the frequency of a signal outputted from the local oscillator 16 to the front end 10. The frequency is shifted by 10.7 MHz from that for the requested station. A signal for the requested station is extracted in the front end 10, and then outputted to the IF amplifying/detecting circuit 12 connected to the output terminal of the front end 10.

In this embodiment, a band-pass filter (BPF) 30 passing waves having a frequency of 76 kHz, which is equal to the frequency of carrier waves for superimposed FM data, and a decoder for decoding superimposed FM data extracted in the BPF 30, are successively connected to the output terminal of the IF amplifying/detecting circuit 12. The decoder for the superimposed FM data comprises an LMSK demodulating circuit 32, synchronism reproducing circuit 34 and error correcting circuit 36.

When the detected signal from the IF amplifying/detecting circuit 12 is supplied to the BPF 30, the BPF 30 extracts a signal having a frequency band of 76 kHz. FM data superimposed on the detected signal are extracted by LMSK modulation. The extracted LMSK signal is supplied to the LMSK modulating circuit 32, and then demodulated to digital data in the form of "1" or "0".

The synchronism reproducing circuit 34 detects a block identification code (BIC) in the demodulated digital data. The frame synchronization and block synchronization are achieved based on the BIC, and then the frame structure of the superimposed data, shown in FIG. 1, is reproduced.

The digital data reproduced in the synchronism reproducing circuit 34 are outputted to the error correcting circuit 36. The error correcting circuit 36 corrects errors included in the data packet (composed of 176 bits) of the reproduced digital data using a CRC and parity located successively to the data packet, and also corrects errors in the vertical direction using parity packets located in the frame. When the number of error bits within the block, or when that at a corresponding position of the data packets in the vertical direction is 11 or less, the error correcting circuit 36 can correct the error.

The digital data after the error correction are sequentially stored in a RAM 42 under the control of an application microcomputer 40, and shown in the display 44 such as a liquid crystal display. A ROM 46 is a Chinese character ROM, which is referred to when the superimposed data is character information.

The superimposed data outputted from the error correcting circuit 36 is inputted to a service identification code (SI) judging circuit 38 for judging the SI included in the superimposed data. The SI judging circuit 38 compares the SI of the superimposed data with service detecting conditions preset by the application microcomputer 40, and outputs a predetermined service detecting signal to a control section of the station selecting microcomputer 22 according to the result of the comparison.

Figure 8:
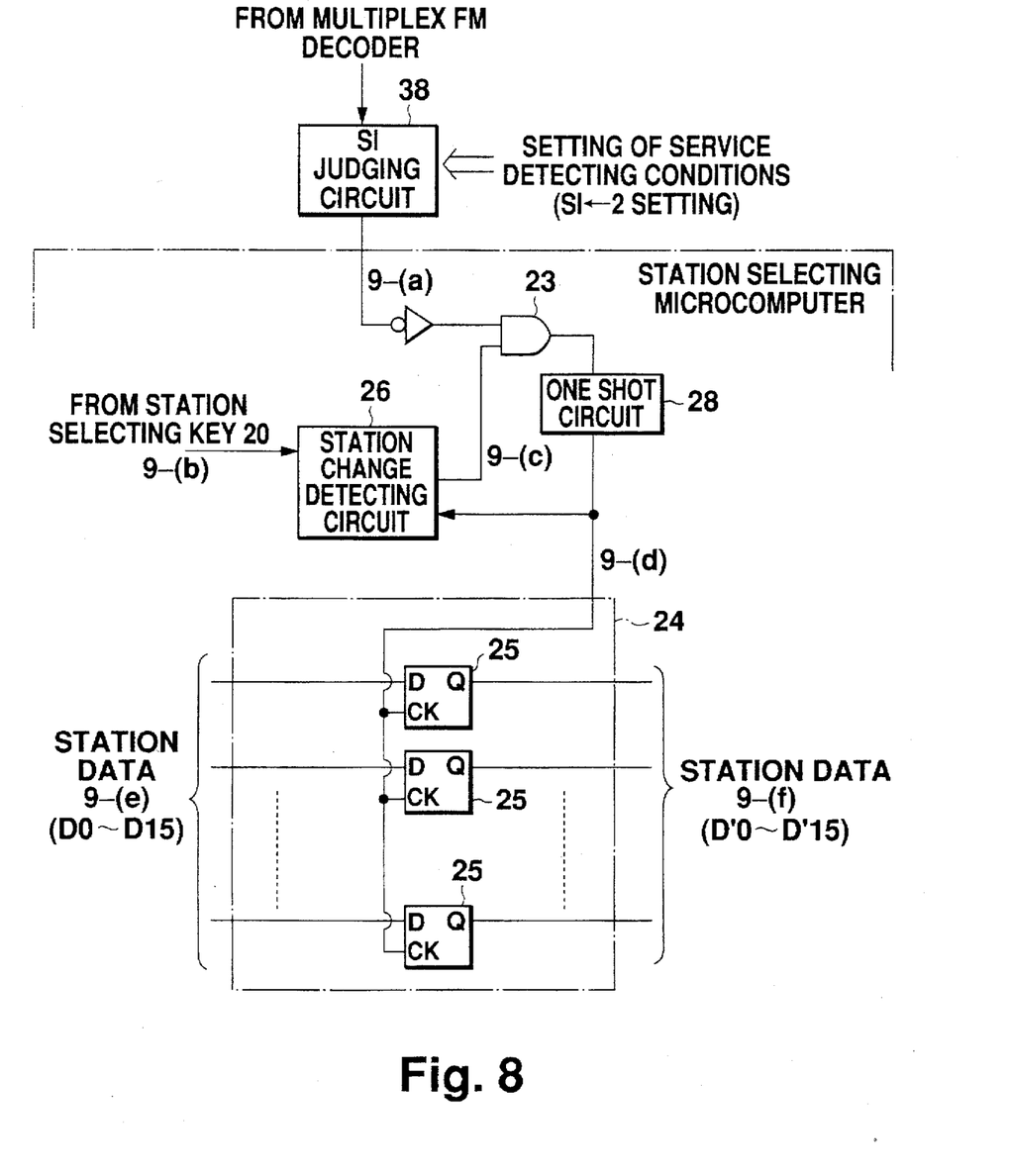
FIG. 8 represents the structure of a control microcomputer 22 and SI judging circuit 38 shown in FIG. 7.

The station selecting microcomputer 22 comprises a timing signal generating section. As shown in FIG. 8, this timing signal generating section has a station change detecting circuit 26 for detecting a command from the station selecting key 20 shown in FIG. 7, a circuit 23 for calculating the theoretical product of the service detecting signal outputted from the SI judging circuit 38, a station change request detecting signal outputted from the station change detecting circuit 26, and a one shot circuit 28. The timing signal generating section has a control section 24 connected to the output terminal of the one shot circuit 28. In the control section 24, a plurality of flip-flop circuits 25 are arranged in parallel. The station data D0–D15 are supplied to the respective D terminals of the flip-flop circuit, and the flip-flop circuit outputs station data D'0–D'15 from its Q terminals to a PLL frequency synthesizer 18 shown in FIG. 7.

[Operation of FM radio receiver]

The operation of an FM radio receiver according to the preferred embodiment of the present invention when changing the station will be described with reference to FIGS. 7, 8 and 9.

When the station is changed from station A to station B, a user operates the station selecting key 20 shown in FIG. 5 to select the station B. A station change request signal (see FIG. 9(b)) and station selecting signal for the station B are supplied together to the station selecting microcomputer 22. The station selecting microcomputer 22 creates predetermined station data (D0–D15) corresponding to the frequency of carrier waves (i.e. frequency signal) from the station B at the rising edge of the station request signal. The created station data are supplied to the D terminal of the flip-flop circuit 25 in the station selection control section 24 shown in FIG. 8 (see FIG. 9 (e)).

Figure 9:
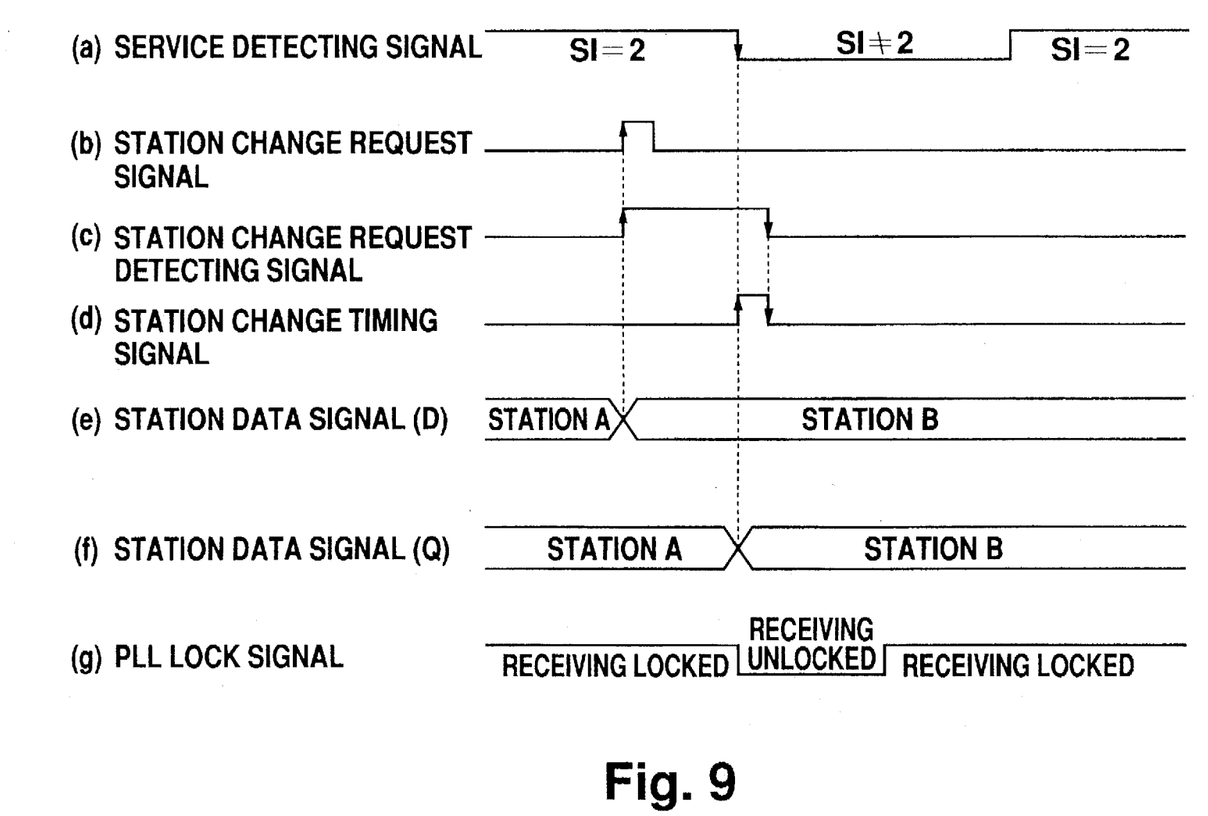
FIG. 9 shows the waveform of a signal representing the operation of an FM radio receiver according to the preferred embodiment of the present invention when changing the received broadcasting station.

The station change detecting circuit 26 outputs a station change request detecting signal, which becomes H level when the station change request signal becomes H level, as shown in FIG. 9 (c). The outputted station change request detecting signal at H level is supplied to one of the terminals of the AND circuit 23.

The SI judging circuit 38 detects an SI in the prefix in a data packet included in the superimposed FM data supplied from a multiplex FM decoder, and compares the detected SI included in the superimposed FM data with a predetermined service detecting conditions for the kind of requested service (for example, SI 2). When the detected SI is SI 2, the SI judging circuit 38 generates a service detecting signal at H level as shown in FIG. 9 (a). When the detected SI is not SI 2, it generates a service detecting signal at L level. The service detecting signal is supplied to the other terminal of the AND circuit 23 via an invertor, as shown in FIG. 8. An output signal at H level from the NOT circuit is used as an unnecessary service detecting signal, when detecting a block including an unnecessary service.

The AND circuit 23 outputs a signal at H level to a one shot circuit 28 when the station change request signal becomes H level by requesting the change of the receiving station, and also the unnecessary service detecting signal becomes H level due to receiving an unnecessary block.

The one shot circuit 28 generates a signal (station change timing signal) at H level for a predetermined period when the signal from the AND circuit 23 becomes H level, and feeds it back to the station change detecting circuit 26. The output signal (station change request detecting signal) from the station change detecting circuit 26 to the AND circuit 23 becomes L level at the falling edge of the output signal of the one shot circuit 28 (see FIG. 9 (c)). A station change timing signal controlling the timing of the change in frequency signal (shown in FIG. 9 (d)) is supplied to the CK terminal of the respective flip-flop circuits 25 in the control section 24.

Station data (D0–D15) corresponding to the requested station B are supplied to the D terminal of the flip-flop circuits 25 shown in FIG. 8 (see FIG. 9 (e)). The flip-flop circuit 25 outputs station data (D'0–D'15) from its Q terminals at the timing of the change in frequency signal, that is, at the rising edge of the station change timing signal (shown in FIG. 9 (d)) supplied to its CK terminal (see FIG. 9 (f)).

The station data (D'0–D'15) are inputted to the PLL frequency synthesizer 18 shown in FIG. 7. The PLL frequency synthesizer 18 operates according to the inputted station data (D'0–D'15), causing the frequency of the signal outputted from the local oscillator 16 to shift by 10.7 MHz from that of the B station. Consequently, the frequency of the requested station B is extracted at the front end 10, and then the receiving of a multiplex FM broadcast from the station B begins. When the station data is supplied to the PLL frequency synthesizer 18, it is set into a received frequency changing mode, and then a receiving unlock signal is supplied at H level to the station selecting microcomputer 22 in order to indicate that the receiving is in the unlocked state, as shown in FIG. 9 (g). When the PLL is locked by completing the operation for changing the output frequency, a receiving lock signal at H level is supplied to the station selecting microcomputer 22.

The station selecting microcomputer 22 detects the signal from the PLL frequency synthesizer 18 to change from receiving unlocked (L) to locked (H). The SI judging circuit 38 detects the service identification code (SI 2) in the superimposed FM data received after the PLL has been locked in response to the detection of the receiving lock signal by the station selecting microcomputer 22.

Figure 10:
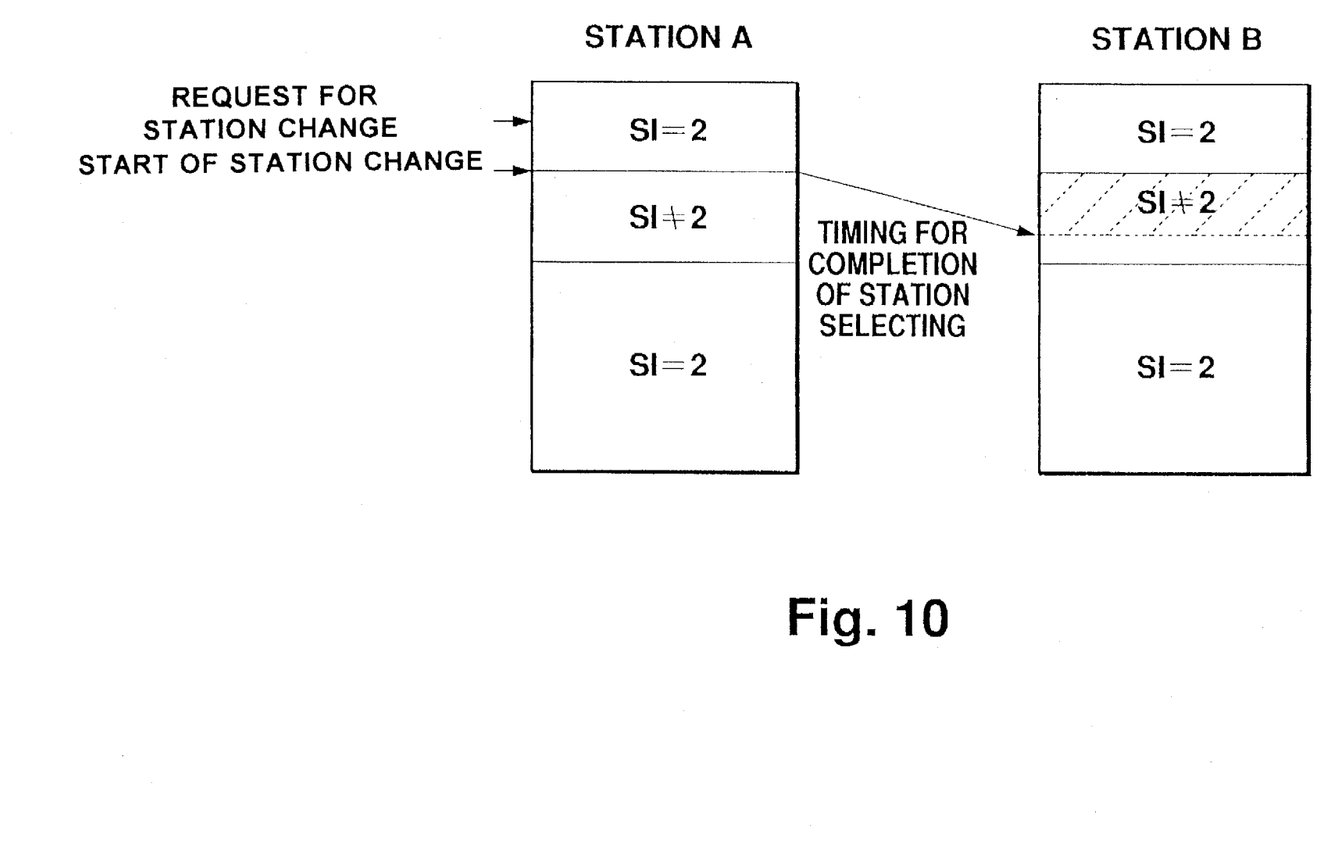
FIG. 10 shows the concept of timing for changing the station according to the preferred embodiment of the present invention.

In this preferred embodiment, when the superimposed data from the station A and B are synchronized, as shown in FIG. 10, the change in station is not carried out before the SI in the received superimposed FM data coincides with one of those determined by unnecessary services, even if the change of the broadcasting station is requested. For example, in a multiplex FM radio receiver for receiving superimposed data only at Level 1 for general information (SI 2), the station is changed from station A to station B when the change of the station is requested, and also the SI 2 of the received block is not SI 2. Even in a multiplex FM radio receiver for receiving other superimposed data at Level 2 or 3 in addition to data at Level 1, the change of the station is carried out during a period of receiving data blocks without SI 2 when the multiplex FM radio receiver only shows superimposed data at Level 1.

A part of a superimposed FM data block with SI 2 is prevented from being NG. A period from receiving a block without SI 2 to requesting the B station, during which superimposed data at Level 1 for general information are not received, is NG. This can reduce a useless part of the previously received superimposed FM data.

When the selection of a station is completed during a period for receiving data blocks without SI 2 after changing the station, as shown in FIG. 10, incoming data blocks with SI 2 can be immediately received. When the error correction is carried out for one block, the received superimposed FM data can be shown more quickly.

The timing for the change in frequency signal is set at the beginning of a block for an unnecessary service, as shown in FIG. 4 B. This prevents a plurality of blocks from being NG when the period from requesting the change in frequency signal to completing the selection of a station is 18 msec or less. Therefore, data blocks with SI 2 can be received, even when data blocks without SI 2 are transmitted.

The 82 parity packets are located in superimposed FM data in order to carry out error correction in the vertical direction, as shown in FIG. 1. The kind of block in the received superimposed FM data is judged by the block identification code (BIC). When the change of the station is requested, and also the parity packet for the error correction in the vertical direction or a block near the parity packet is received, the change in frequency signal can be carried out during a period for receiving the parity or the block near the parity.

As described above, in an FM radio receiver and signal processing device used therein provided by the present invention, the change in received frequency is not carried out before the signal processing device detects a block for an unnecessary service, even when the change is requested. The change of the received station is carried out during a period for receiving a block for an unnecessary service.

This enables the period for receiving data blocks for unnecessary services to become NG, but that for receiving data blocks for necessary services not to become NG, leading to reduction of a useless part of the previously received superimposed FM data.

While there has been described what is at present considered to be a preferred embodiment of the present invention, it will be understood that various modifications may be made thereto, and it is intended that the appended claims cover all such modifications as fall within the true spirit and scope of the present invention.

What is claimed is:

1. An FM radio receiver for receiving a multiplex FM broadcast on which data are superimposed, the FM radio receiver comprising:

a station selecting section for selecting a frequency signal of a requested broadcasting station;

a service judging section for detecting a service identification code of a block in superimposed FM data included in a multiplex FM broadcast being received, and judging the kind of service included in the block;

a timing signal generating section for generating a station change timing signal based on the kind of service detected; and a station selecting control section for permitting the frequency signal in the station selecting section to change according to the station change timing signal.

2. An FM radio receiver in accordance with claim 1, wherein the service judging section judges whether the service included in the received block is needed according to the detected service identification code, and then generates an unnecessary service detecting signal when the received block in not needed, and the timing signal generating section generates the station change timing signal in response to the generation of the unnecessary service detecting signal.

3. An FM radio receiver in accordance with claim 2, further comprising:

a station change directing section for generating a station change request signal for changing a broadcasting station, wherein the station selecting section generates a frequency signal based on a station data signal corresponding to the requested broadcasting station, and the station selecting control section supplies the station data signal created based on the station change request signal to the station selecting section in response to the generation of the station change timing signal.

4. An FM radio receiver in accordance with claim 3, wherein the station selecting control section has a plurality of flip-flop circuits, the flip-flop circuits outputting the station data signal to the station selecting section, when the station data signal is supplied to its data terminal in response to the station change request signal, and the station change timing signal is supplied to its clock terminal from the timing signal generating section.

5. An FM radio receiver in accordance with claim 2, wherein the timing signal generating section generates the station change timing signal in response to the unnecessary service detecting signal and a station change request signal for changing a broadcasting station.

6. An FM radio receiver in accordance with claim 5, wherein the timing signal generating section generates the station change timing signal for a certain period when the unnecessary service detecting signal and the station change request signal for changing the broadcasting station are supplied.

7. A signal processing device, which is used in an FM radio receiver for demodulating data superimposed on a received FM signal of a selected broadcasting station, the signal processing device comprising:

a service judging section for detecting whether a service included in a block in the received FM data superimposed on a multiplex FM broadcast is needed, according to a service identification code of the block, and then generating an unnecessary service detecting signal when the received block is not needed; and a timing signal generating section for generating a station change timing signal based on the unnecessary service detecting signal.

8. A method of receiving a multiplex FM broadcast on which data are superimposed, the method comprising the steps of:

selecting a frequency signal of a requested broadcasting station;

detecting a service identification code of a block in superimposed FM data included in a multiplex FM broadcast being received;

judging a kind of service included in the block;

generating a station change timing signal based on the kind of service detected; and permitting the frequency signal to change according to the station change timing signal.

9. A method according to claim 8, further comprising the steps of:

judging whether the service included in the received block is needed according to the detected service identification code;

generating an unnecessary service detecting signal when the received block in not needed; and generating the station change timing signal in response to the generation of the unnecessary service detecting signal.

10. A method according to claim 9, further comprising the steps of:

generating a station change request signal for changing a broadcasting station;

generating a frequency signal based on a station data signal corresponding to the requested broadcasting station; and suppling the station data signal created based on the station change request signal in response to the generation of the station change timing signal.

11. A method according to claim 9, further comprising the step of generating the station change timing signal in response to the unnecessary service detecting signal and a station change request signal for changing a broadcasting station.

12. A method according to claim 11, further comprising the step of generating the station change timing signal for a certain period when the unnecessary service detecting signal and the station change request signal for changing the broadcasting station are supplied.

13. A method of signal processing, which is used in an FM radio receiver for demodulating data superimposed on a received FM signal of a selected broadcasting station, the method comprising the steps of:

detecting whether a service included in a block in the received FM data superimposed on a multiplex FM broadcast is needed, according to a service identification code of the block;

generating an unnecessary service detecting signal when the received block is not needed; and generating a station change timing signal based on the unnecessary service detecting signal.

* * * * *